(12) United States Patent
Sukegawa et al.

(10) Patent No.: US 11,726,268 B1
(45) Date of Patent: Aug. 15, 2023

(54) FERRULE, OPTICAL CONNECTOR, AND OPTICAL CONNECTOR MODULE

(71) Applicant: Enplas Corporation, Saitama (JP)

(72) Inventors: Takayuki Sukegawa, Saitama (JP); Yuto Kujirai, Saitama (JP)

(73) Assignee: Enplas Corporation, Saitama (JP)

(*) Notice: Subject to any disclaimer, the term of this patent is extended or adjusted under 35 U.S.C. 154(b) by 0 days.

(21) Appl. No.: 17/704,093

(22) Filed: Mar. 25, 2022

(51) Int. Cl.
*G02B 6/38* (2006.01)

(52) U.S. Cl.
CPC ......... *G02B 6/3838* (2013.01); *G02B 6/3866* (2013.01)

(58) Field of Classification Search
None
See application file for complete search history.

(56) References Cited

U.S. PATENT DOCUMENTS

| | | | | |
|---|---|---|---|---|
| 10,545,294 B1* | 1/2020 | Jian | ...................... | G02B 6/3863 |
| 11,256,040 B1* | 2/2022 | Terem | .................. | G02B 6/3855 |
| 2001/0007603 A1* | 7/2001 | Sakurai | ................ | G02B 6/3865 |
| | | | | 385/60 |
| 2001/0036341 A1* | 11/2001 | Ohtsuka | ............... | G02B 6/3834 |
| | | | | 385/85 |
| 2008/0144999 A1* | 6/2008 | Takeda | ................. | G02B 6/3861 |
| | | | | 385/51 |
| 2011/0311183 A1* | 12/2011 | Owen, III | ............ | G02B 6/3818 |
| | | | | 385/62 |
| 2016/0282576 A1* | 9/2016 | Nishimura | ........... | G02B 6/4292 |
| 2019/0049671 A1* | 2/2019 | Haase | .................... | G02B 6/382 |
| 2019/0154927 A1* | 5/2019 | Shimakawa | ............. | G02B 6/36 |

FOREIGN PATENT DOCUMENTS

JP 2016-180946 A 10/2016

* cited by examiner

*Primary Examiner* — Jerry Rahll
(74) *Attorney, Agent, or Firm* — Shih IP Law Group, PLLC

(57) ABSTRACT

A ferrule includes an optical transmission member holding part configured to hold an optical transmission member; a first surface that faces an end portion of the optical transmission member when the optical transmission member is held at the optical transmission member holding part; and a through hole that is open between the optical transmission member holding part and the first surface.

9 Claims, 11 Drawing Sheets

FERRULE, OPTICAL CONNECTOR, AND OPTICAL CONNECTOR MODULE

Technical Field

The present invention relates to a ferrule, an optical connector, and an optical connector module.

Background Art

Ferrules in which optical transmission members (such as optical fibers and light waveguides) are disposed are known. A ferrule in which an optical transmission member is disposed serves as an optical connector, and is used to achieve optical connection.

For example, PTL 1 discloses an optical system (optical connector). This optical system includes an optical assembly (ferrule), and an optical fiber (optical transmission member). The optical assembly is configured to receive the optical fiber.

CITATION LIST

Patent Literature
PTL 1
Japanese Patent Application Laid-Open No. 2016-180946

SUMMARY OF INVENTION

Technical Problem

When an optical transmission member is disposed at the ferrule disclosed in PTL 1, it is preferable that the ferrule be free of foreign matters. Examples of the foreign matters include floating foreign matters such as dust and resin foreign matters generated as a result of the ferrule being scraped when the optical transmission members are placed on the ferrule. To remove the foreign matters, it is conceivable to use a blower or the like to remove the foreign matters. However, even when removing the foreign matters by using the blower and the like, the foreign matters may retain at the ferrule and may not be completely removed.

An object of the present invention is to provide a ferrule that can easily remove foreign matters. In addition, another object of the present invention is to provide an optical connector including the ferrule.

Solution to Problem

A ferrule of an embodiment of the present invention includes: an optical transmission member holding part configured to hold an optical transmission member; a first surface that faces an end portion of the optical transmission member when the optical transmission member is held at the optical transmission member holding part; and a through hole that is open between the optical transmission member holding part and the first surface.

An optical connector of an embodiment of the present invention includes: the ferrule; and an optical transmission member held by the optical transmission member holding part of the ferrule.

An optical connector module of an embodiment of the present invention includes the optical connector.

Advantageous Effects of Invention

According to the present invention, it is possible to provide a ferrule that can easily remove foreign matters. In addition, according to the present invention, it is possible to provide the optical connector including the ferrule. In addition, according to the present invention, it is possible to provide the optical connector module including the optical connector.

DESCRIPTION OF EMBODIMENTS

Embodiment 1

Optical Connector

Figure 1A:
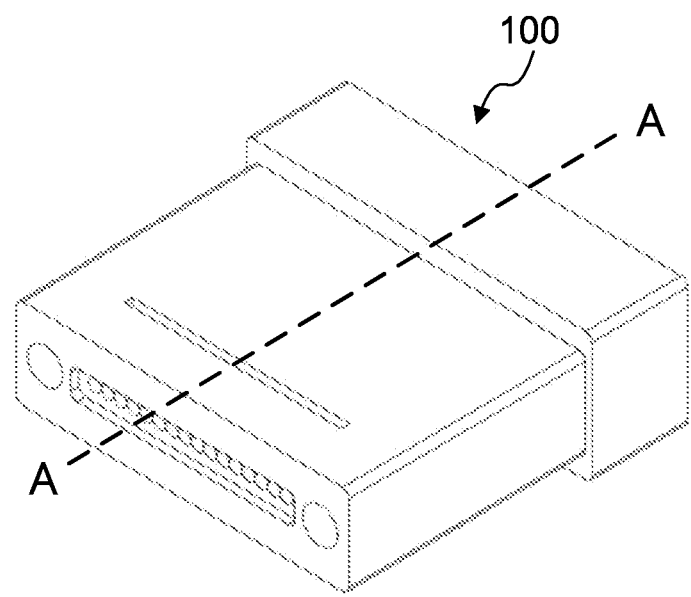
FIG. 1A is a perspective view of an optical connector according to Embodiment 1.
Figure 1B:
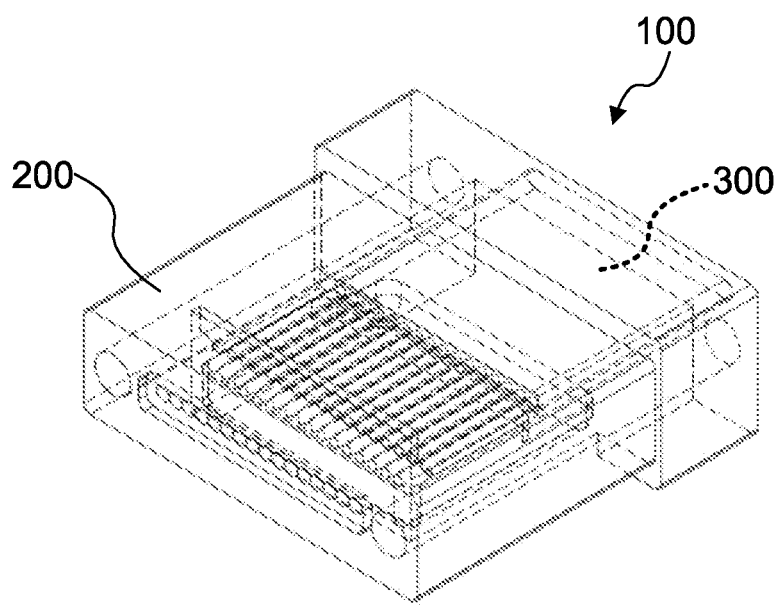
FIG. 1B is a perspective view of FIG. 1A.

FIG. 1A is a perspective view of optical connector 100 according to Embodiment 1 of the present invention, and FIG. 1B is a see-through perspective view of FIG. 1A. In addition, FIG. 2 is a sectional view taken along line A-A of FIG. 1A.

Figure 2:
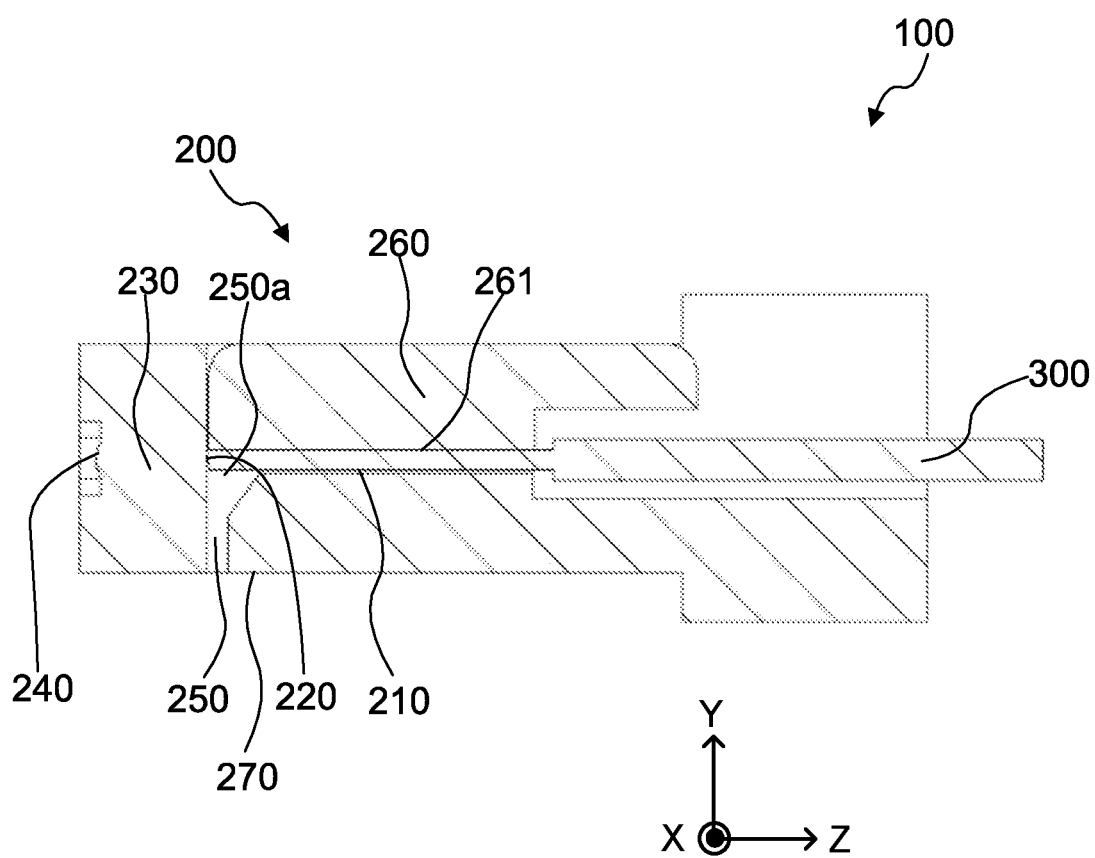
FIG. 2 is a sectional view of the optical connector according to Embodiment 1.

As illustrated in FIGS. 1A, 1B and 2, optical connector 100 includes ferrule 200 and optical transmission member 300. Optical transmission member 300 is held by optical transmission member holding part 210 of ferrule 200. An end portion of the held optical transmission member 300 is disposed to face first surface 220 of ferrule 200. Ferrule 200 provided with optical transmission member 300 serves as optical connector 100. As illustrated in FIG. 2, ferrule 200 in optical connector 100 of the embodiment of the present invention includes through hole 250. Through hole 250 serves as a path for foreign matters for removing the foreign matters before optical transmission member 300 is disposed at ferrule 200, and facilitates the removal of the foreign matters. Details of through hole 250 are described later.

Optical connector 100 is used for optically connecting the end portions of optical transmission member 300. More specifically, by coupling the front surfaces of two optical connectors 100 holding the end portions of optical transmission member 300, the end portions of optical transmission member 300 can be optically coupled with each other.

Note that examples of optical transmission member 300 include an optical fiber and a light waveguide. In the present embodiment, optical transmission member 300 is an optical fiber. In the present embodiment, a plurality of optical fibers is bundled in a row by a coating member and in a ribbon shape.

Configuration of Ferrule

Figure 3A:
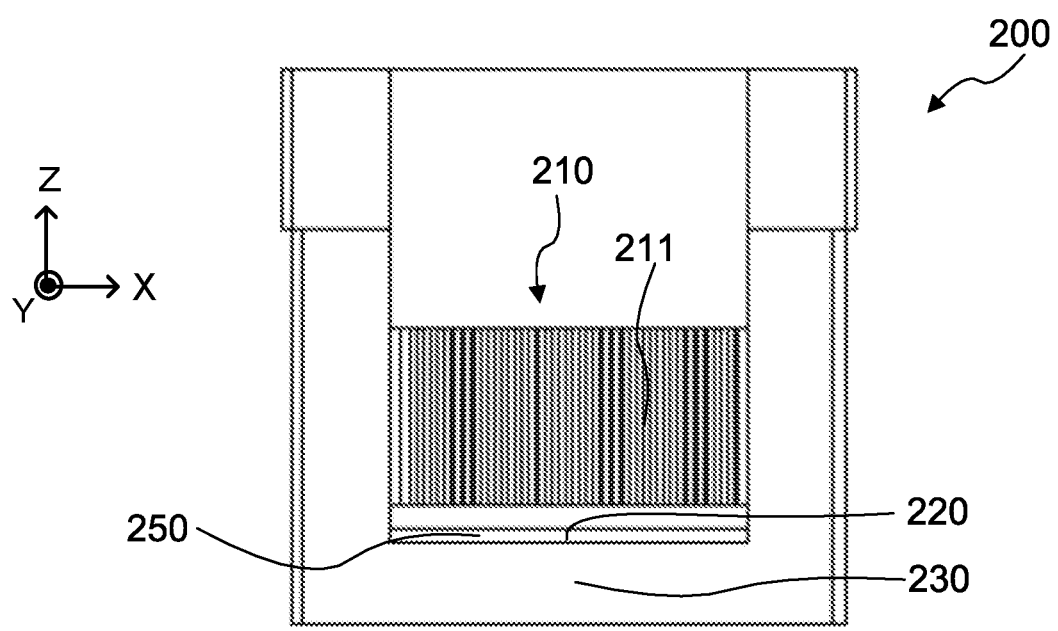
FIG. 3A is a plan view of a ferrule according to Embodiment 1.
Figure 3B:
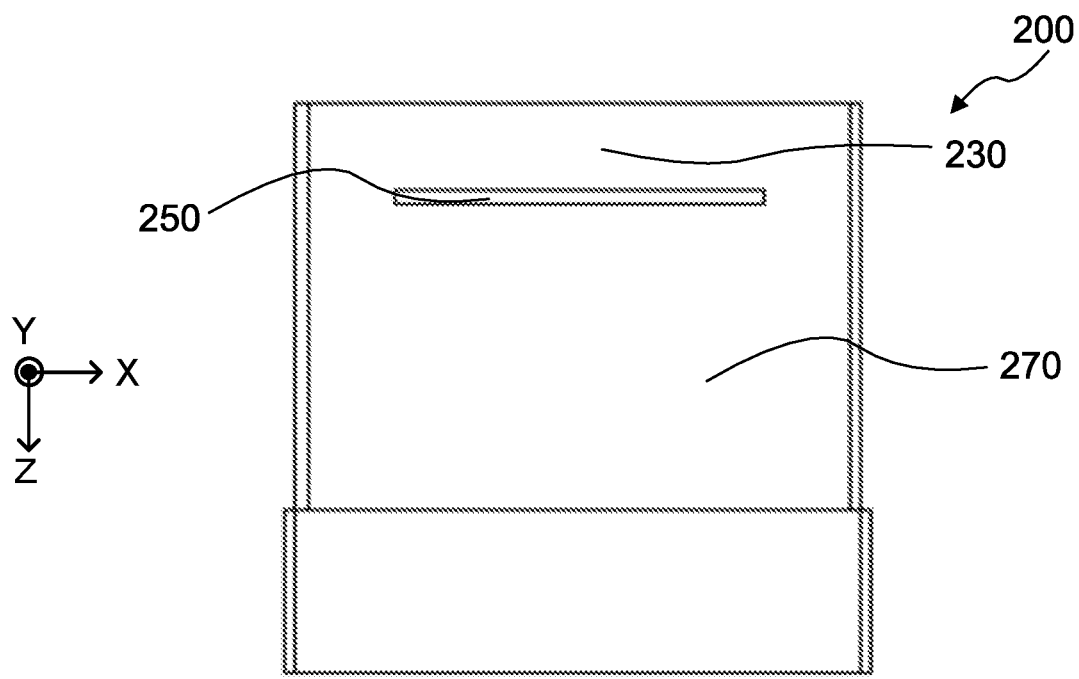
FIG. 3B is a bottom view of the ferrule.
Figure 4A:
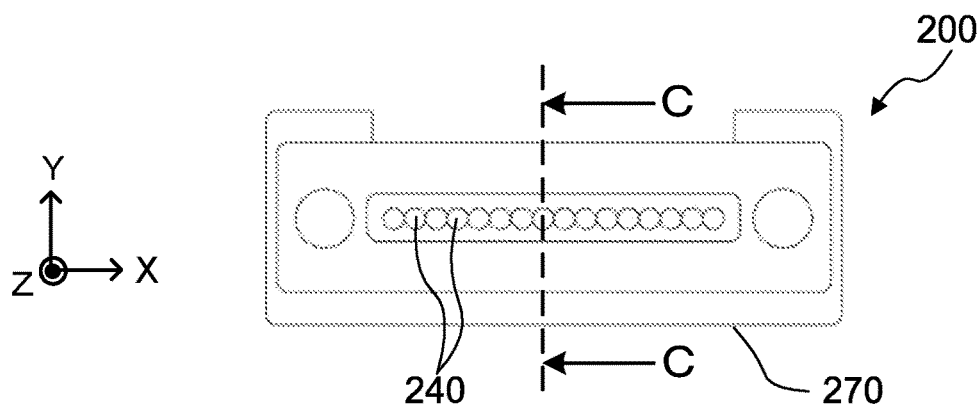
FIG. 4A is a front view of the ferrule according to Embodiment 1.
Figure 4B:
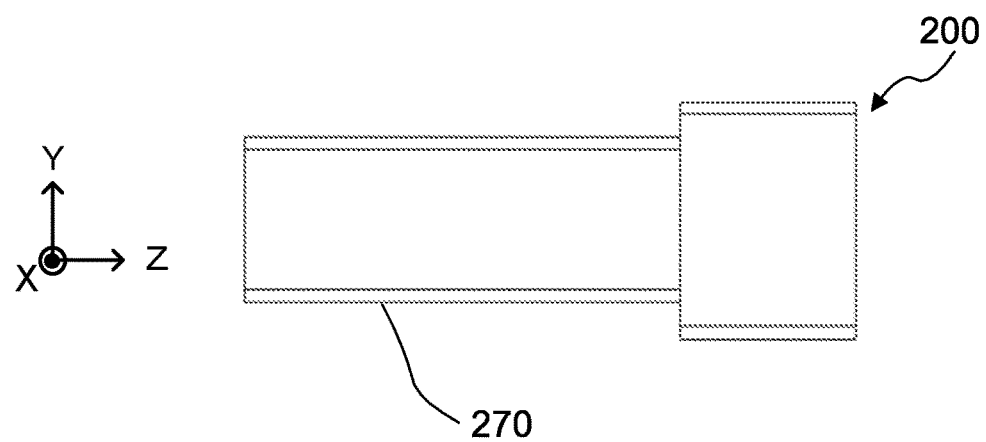
FIG. 4B is a right side view of the ferrule according to Embodiment 1.
Figure 4C:
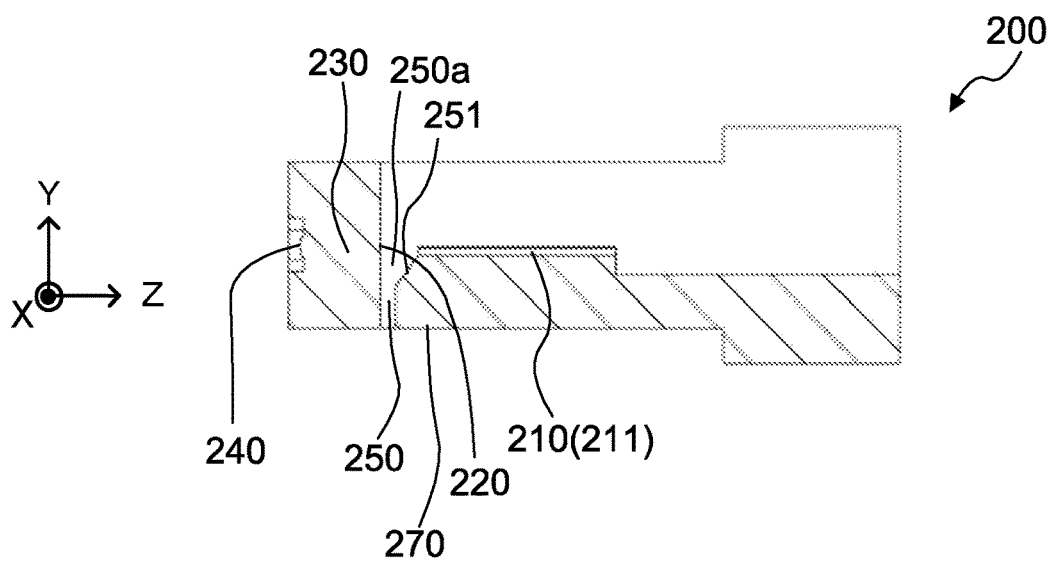
FIG. 4C is a sectional view of the ferrule according to Embodiment 1.
Figure 5A:
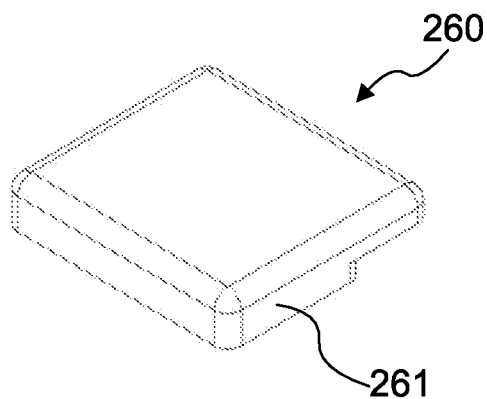
FIG. 5A is a perspective view of a lid of the ferrule according to Embodiment 1.
Figure 5B:
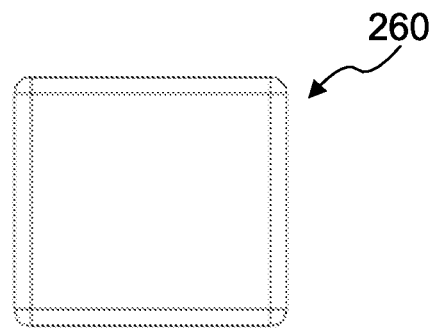
FIG. 5B is a plan view.
Figure 5C:
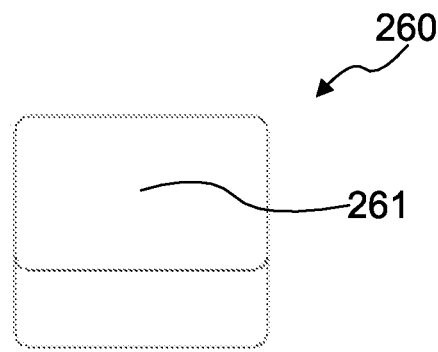
FIG. 5C is a bottom view.
Figure 5D:
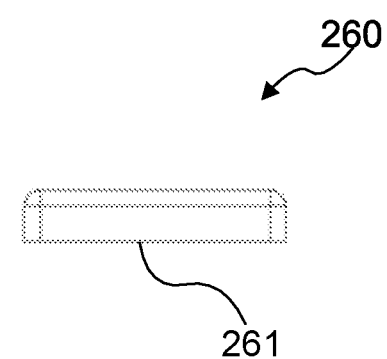
FIG. 5D is a front view.
Figure 5E:
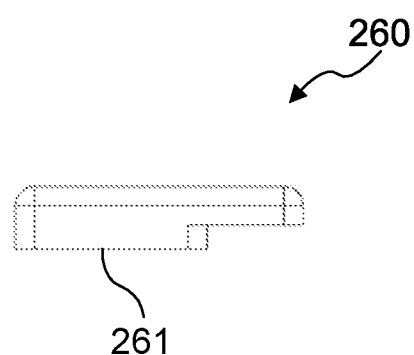
FIG. 5E is a right side view.

FIG. 3A is a plan view of ferrule 200, and FIG. 3B is a bottom view. FIG. 4A is a front view of ferrule 200, FIG. 4B is a right side view, and FIG. 4C is a sectional view taken along line C-C of FIG. 4A. FIG. 5A is a perspective view of lid 260 where ferrule 200 is disposed, FIG. 5B is a plan view, FIG. 5C is a bottom view, FIG. 5D is a front view, and FIG. 5E is a right side view. Note that FIGS. 3A to 4C illustrate ferrule 200 where lid 260 illustrated in FIGS. 5A to 5E is not disposed. Note that lid 260 is disposed at ferrule 200 as illustrated in FIG. 2, and holds optical transmission member 300 between optical transmission member holding part 210 and lid 260.

As illustrated in FIGS. 3A to 4C, ferrule 200 has a substantially cuboid shape. Ferrule 200 includes optical transmission member holding part 210, first surface 220, light transmission wall 230, second surface 240, and through hole 250. These components are described below.

Note that in the following description, the direction along the bottom surface of ferrule 200 is "X direction" in front view of ferrule 200 as illustrated in FIGS. 4A and 4B. In addition, the direction orthogonal to the X direction is "Y direction." The "Y direction" is the direction (height direction) along the side surface in front view of ferrule 200. In addition, the "Z direction" is a direction orthogonal to the "X direction" and the "Y direction". That is, as illustrated in FIG. 4B, the "Z direction" is a direction along the bottom surface of ferrule 200 in side view of ferrule 200.

Optical transmission member holding part 210 is a part that holds optical transmission member 300. Optical transmission member holding part 210 is not limited as long as it can hold optical transmission member 300. In the present embodiment, optical transmission member holding part 210 includes groove 211 where optical transmission member 300 is disposed. In plan view as illustrated in FIG. 3A, the groove 211 extends in the direction perpendicular to first surface 220. Examples of groove 211 includes a V-groove and a U-groove. Groove 211 is configured such that the end surface of optical transmission member 300 can be disposed at an appropriate position with respect to first surface 220 when optical transmission member 300 is disposed. The number of grooves 211 may be appropriately set in accordance with the number of optical transmission members 300. In the present embodiment, the number of grooves is 16 corresponding to the number of optical transmission members (optical fiber) 300.

First surface 220 is a surface that directly faces the end portion of optical transmission member 300. First surface 220 is a surface where light from optical transmission member 300 impinges, or a surface from which light entered from second surface 240 is emitted toward optical transmission member 300. First surface 220 is disposed at the surface on the side opposite to second surface 240 in light transmission wall 230. In the present embodiment, the first optical surface is parallel to the XY plane.

Light transmission wall 230 is a light-transmitting wall with first surface 220 at one surface and second surface 240 at the other surface. Light transmission wall 230 is a wall through which light entered from first surface 220 or second surface 240 is transmitted.

Second surface 240 is a surface opposite first surface 220 in light transmission wall 230. Second surface 240 is a surface from which light entered from first surface 220 and travelled through the inside of the ferrule is emitted, or a surface where light travelling inside the ferrule toward first surface 220 impinges. Second surface 240 may be a flat surface or a curved surface. Preferably, second surface 240 is an optical control surface. In the present embodiment, second surface 240 is a curved surface, or more specifically, a convex lens. A plurality of second surfaces 240 or one second surface 240 may be provided. In the present embodiment, in accordance with the number of optical transmission members (optical fiber), 16 second surfaces 240 serving as convex lenses are provided. In addition, the second surfaces are disposed in a line in the X direction in the present embodiment.

As illustrated in FIGS. 3A and 4C, through hole 250 is disposed to open between optical transmission member holding part 210 and first surface 220. The position of the other opening of through hole 250 is not limited, but is preferably rear surface 270 of ferrule 200. In addition, in the present embodiment, through hole 250 is a through hole with an opening with a rectangular shape that is long in the X direction in plan view and bottom view of ferrule 200 as illustrated in FIGS. 3A and 3B. Through hole 250 is configured to be a path for foreign matters existing in ferrule 200 for the purpose of removing the foreign matters before optical transmission member 300 is held by optical transmission member holding part 210.

More specifically, in the present embodiment, foreign matters are removed by jetting air in the direction from optical transmission member holding part 210 to first surface 220 by using a blower or the like. To facilitate the removal the foreign matters moved by the air jetting in the direction toward the first surface, through hole 250 is disposed to open between optical transmission member holding part 210 and first surface 220.

In addition, regarding the arrangement of through hole 250, the end portion of the opening of through hole 250 on first surface 220 side may be disposed at a position overlapping first surface 220, or a position separated from first surface 220, in plan view of ferrule 200 with no lid. In the case where the end portion is separated from first surface 220, the distance between first surface 220 and the end portion is preferably greater than 0 mm, and equal to or smaller than 0.1 mm The reason for this is that if the distance is greater than 0.1 mm, a large space for retaining foreign matters is provided, which makes it difficult to remove the foreign matters. On the other hand, if a distance greater than 0 mm is provided even if it is small, it can be used as an optical transmission member supporting part for supporting optical transmission member 300, which makes it easy to correctly align optical transmission member 300 with respect to first surface 220. A case where this space is used as an optical transmission member supporting part will be described in detail in Embodiment 4. Note that the space may be or may not be used as an optical transmission member supporting part. Specifically, when optical transmission member 300 is disposed, the space and optical transmission member 300 may be or may not be in contact with each other.

In the present embodiment, the end portion of through hole 250 on first surface 220 side is disposed to overlap first surface 220 as illustrated in FIG. 3A (see FIG. 2).

Preferably, through hole 250 opens to the front surface side of ferrule 200, extends in the gravity direction, and opens to the rear surface 270 side of ferrule 200. In this manner, the foreign matters can be removed from ferrule 200 by utilizing the gravity. Note that in this specification, the front surface and rear surface 270 do not mean the upper side surface and the lower side surface in the gravity direction in the state where the optical connector (ferrule) is used. The front surface and rear surface 270 means surfaces that can be a surface on the upper side and a surface on the lower side, respectively, in the gravity direction when optical transmission member 300 is disposed at the ferrule (when foreign matters are removed from the ferrule).

In addition, the size of through hole 250 from the opening on one side to the opening on the other side may be constant or vary. In the present embodiment, through hole 250 has a tapered part that becomes thinner as the distance from opening 250a on optical transmission member holding part 210 side increases in a cross-section that is along the extending direction of optical transmission member 300 and is perpendicular to rear surface 270 of ferrule 200 when optical transmission member 300 is held at optical transmission member holding part 210 as illustrated in FIG. 4C. More specifically, in the present embodiment, in the above-described cross-section, the tapered part of through hole 250 is composed of first surface 220 side surface, which is a flat surface continuous from first surface 220, and tilted surface 251, which is tilted toward first surface 220 in the direction toward rear surface 270 of ferrule 200. With through hole 250 including tilted surface 251, foreign matters coming from optical transmission member holding part 210 as a result of, for example, air jetting or the like easily enter through hole 250.

In addition, in the present embodiment, in the above-described cross-section, the size of the opening of through hole 250 on first surface 220 side is preferably 0.2 mm to 0.3 mm, and the size of the opening of rear surface 270 on ferrule 200 side is preferably 0.05 mm to 0.1 mm In this manner, with a large opening on the first surface side, foreign matters easily enter through hole 250. On the other hand, with a small opening on the opposite side, the contamination at the periphery due to the adhesive agent leaked from through hole 250 is suppressed in the case where an adhesive agent is used for fixing optical transmission member 300 to ferrule 200. In this manner, the ease of assembling of optical connector 100 is increased.

Lid 260 is a member disposed at ferrule 200 and configured to hold optical transmission member 300 with the optical transmission member sandwiched between lid 260 and optical transmission member holding part 210. In the present embodiment, lid 260 is a substantially cuboid member. Lid 260 includes optical transmission member pressing part 261. Optical transmission member pressing part 261 is a portion protruding in lid 260, and presses optical transmission member 300 when lid 260 is disposed at ferrule 200 (see FIG. 2).

Effects

Ferrule 200 according to the present embodiment includes through hole 250. In this manner, with ferrule 200, it is easy to remove foreign matters from the through hole 250.

Embodiment 2

Figure 6A:
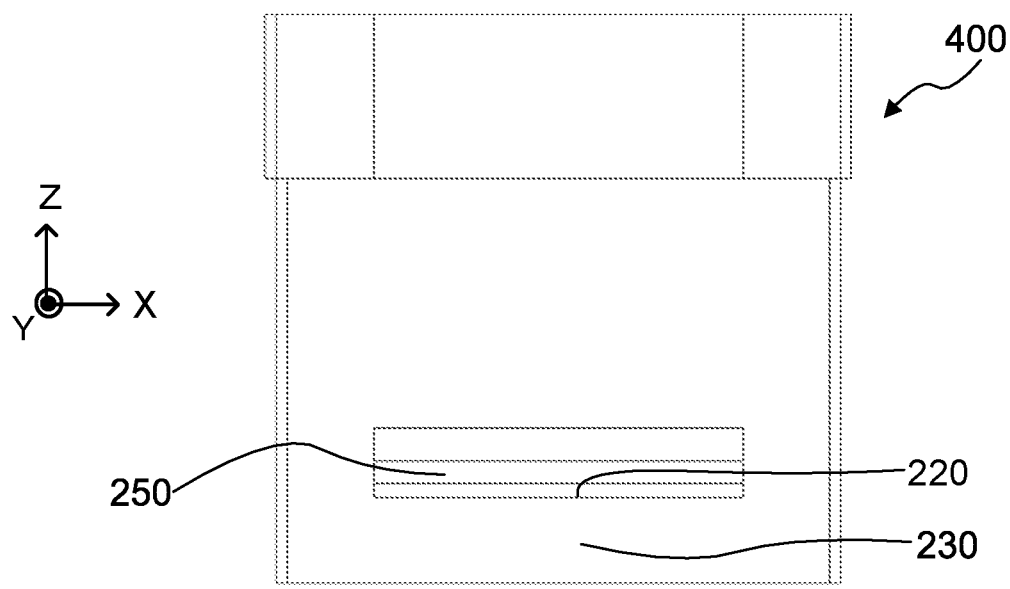
FIG. 6A is a plan view of a ferrule according to Embodiment 2.
Figure 6B:
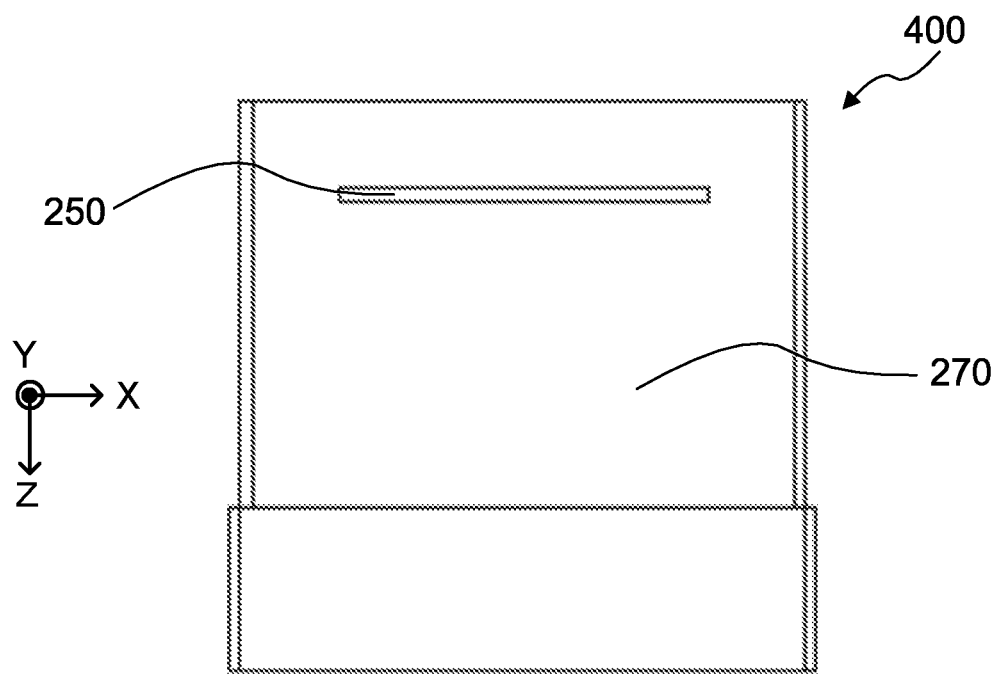
FIG. 6B is a bottom view.
Figure 7A:
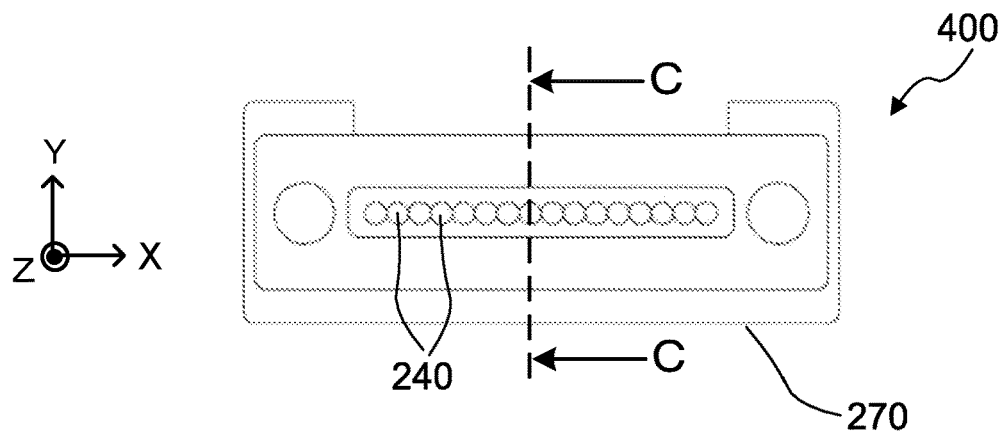
FIG. 7A is a front view of a ferrule according to Embodiment 2.
Figure 7B:
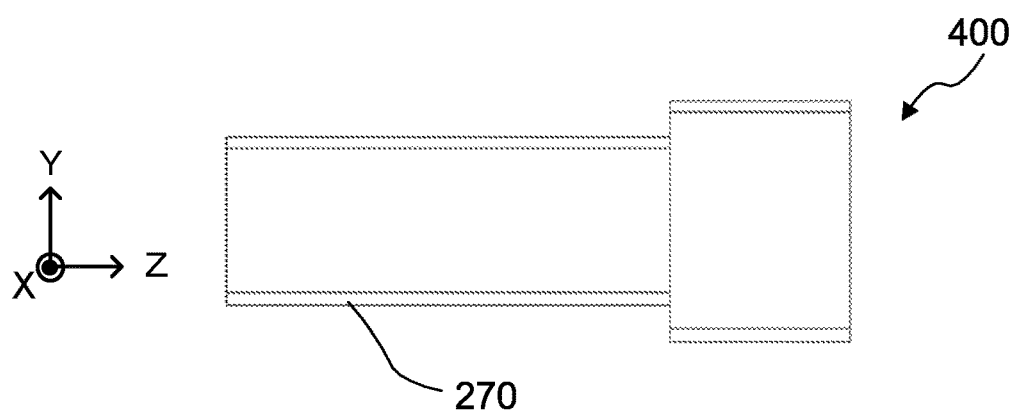
FIG. 7B is a right side view.
Figure 7C:
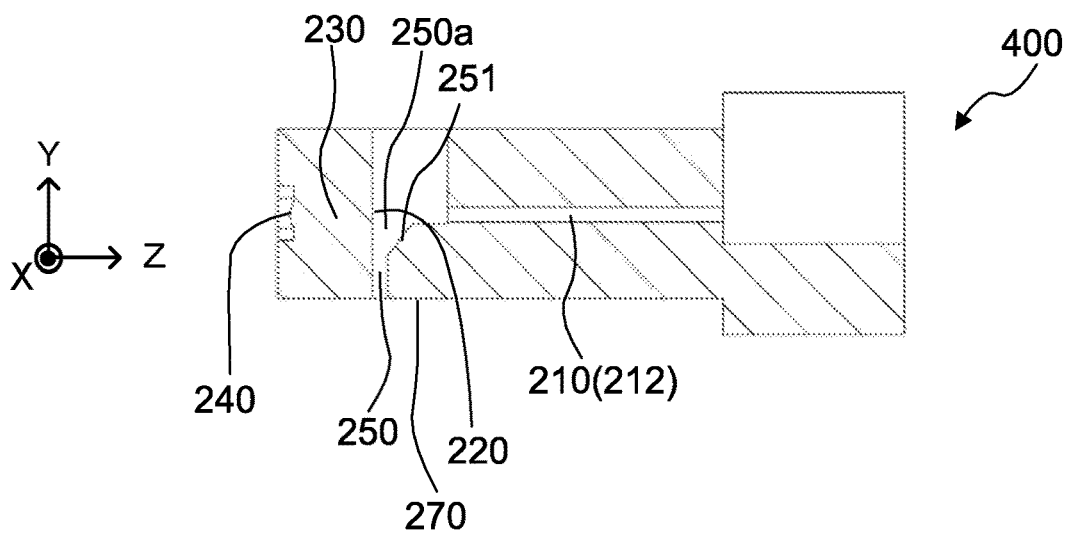
FIG. 7C is a sectional view.

FIGS. 6A to 7C illustrate ferrule 400 according to Embodiment 2. FIG. 6A is a plan view of ferrule 400 according to Embodiment 2, FIG. 6B is a bottom view, FIG. 7A is a front view, FIG. 7B is a right side view, and FIG. 7C is a sectional view taken along line C-C of FIG. 7A. In ferrule 400 according to Embodiment 2, the same components as those of ferrule 200 according to Embodiment 1 are denoted with the same reference numerals and the description thereof is omitted.

As illustrated in FIG. 7C, optical transmission member holding part 210 of ferrule 400 is different from ferrule 200 in that insertion hole 212 to which optical transmission member 300 is inserted is provided. Insertion hole 212 includes an opening at the back surface of ferrule 400, and extends in the direction approximately parallel to rear surface 270 of ferrule 400. Insertion hole 212 sets the end portion of inserted optical transmission member 300 such that it is opposite to first surface 220. Note that ferrule 400 can hold optical transmission member 300 with insertion hole 212. In view of this, ferrule 400 is different from ferrule 200 also in that no lid 260 is provided.

Effects

Ferrule 400 according to the present embodiment includes insertion hole 212 to which optical transmission member 300 is inserted. Thus, ferrule 200 can be held by inserting optical transmission member 300 to insertion hole 212.

Embodiment 3

Figure 8A:
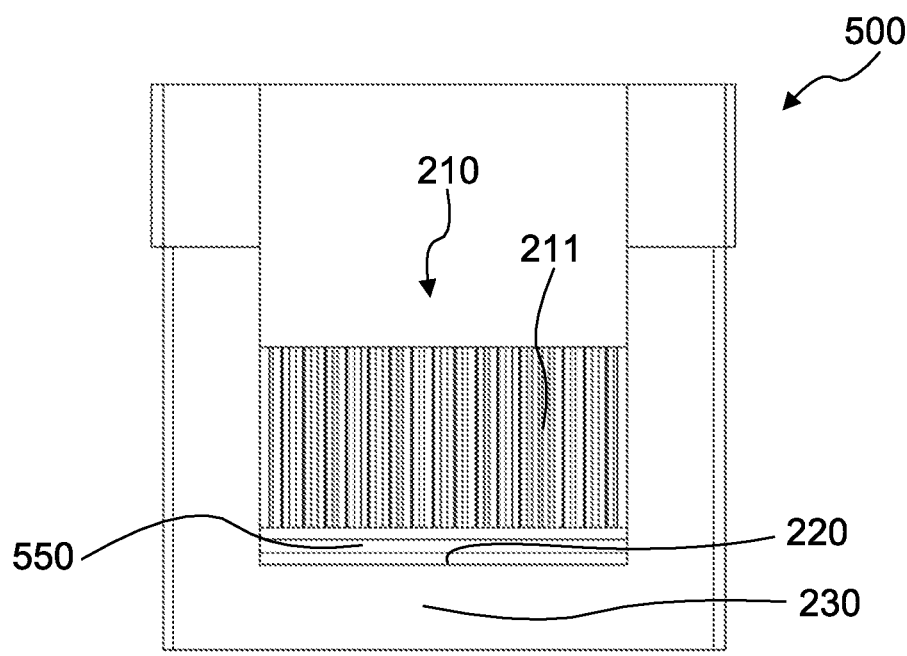
FIG. 8A is a plan view of a ferrule according to Embodiment 3.
Figure 8B:
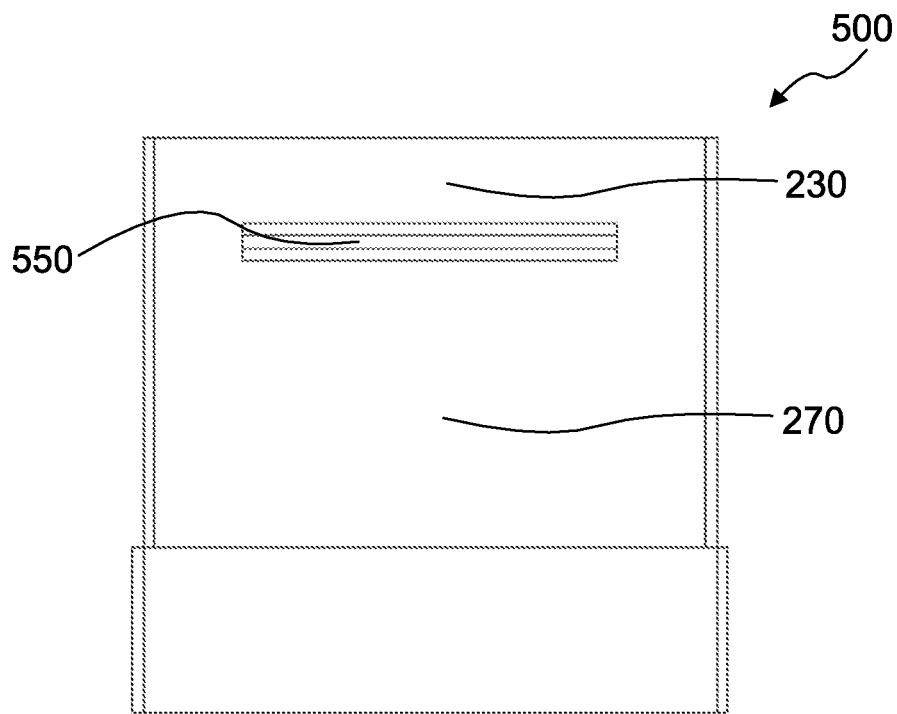
FIG. 8B is a bottom view.
Figure 9A:
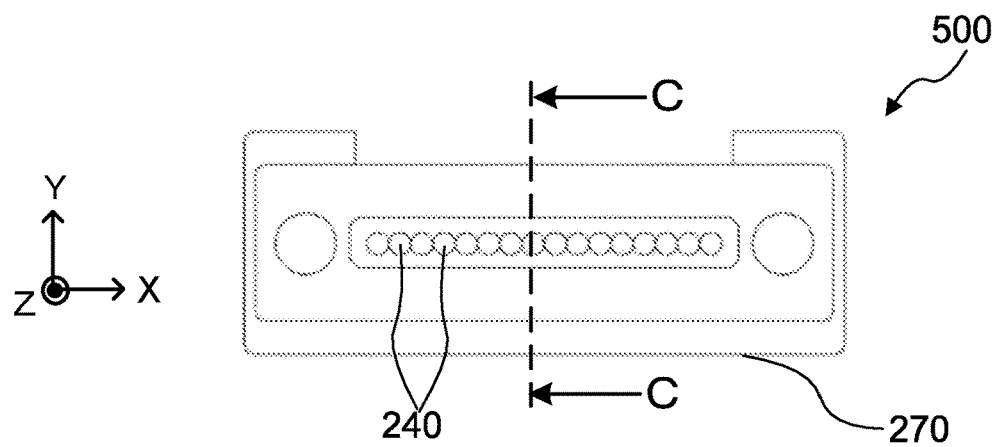
FIG. 9A is a front view of a ferrule according to Embodiment 3.
Figure 9B:
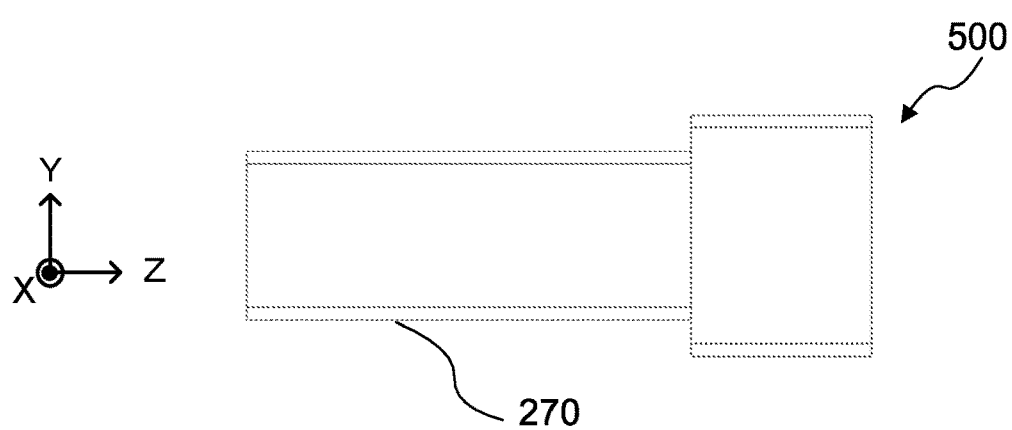
FIG. 9B is a right side view.
Figure 9C:
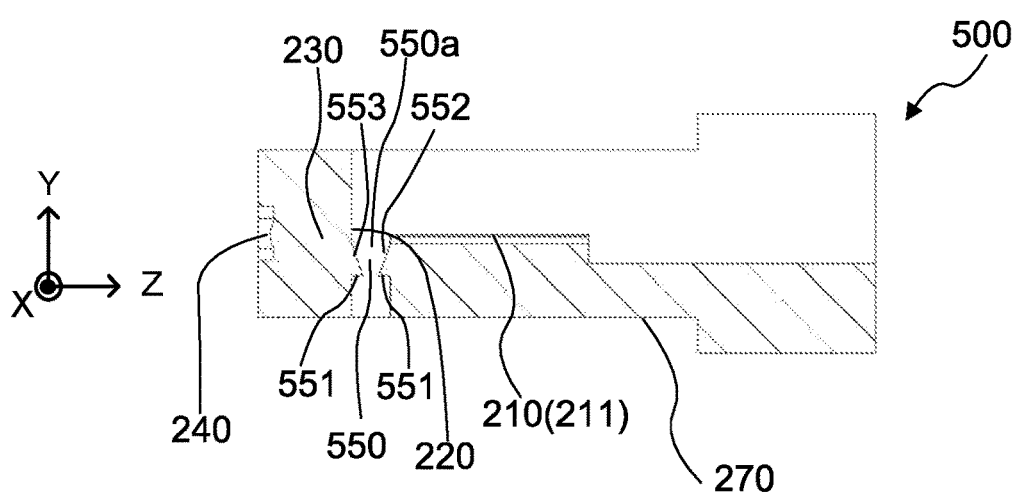
FIG. 9C is a sectional view.

FIGS. 8A to 9C illustrate ferrule 500 according to Embodiment 3. FIG. 8A is a plan view of ferrule 500 according to Embodiment 3, FIG. 8B is a bottom view, FIG. 9A is a front view, FIG. 9B is a right side view, and FIG. 9C is a sectional view taken along line C-C of FIG. 9A. In ferrule 500 according to Embodiment 3, the same components as those of ferrule 200 according to Embodiment 1 are denoted with the same reference numerals and the description thereof is omitted.

As illustrated in FIG. 9C, ferrule 500 includes through hole 550. The shape of through hole 550 is different from that of through hole 250 provided in ferrule 200 according to Embodiment 1.

More specifically, through hole 550 includes step 551 whose width discontinuously increases as the distance from opening 550a on optical transmission member holding part 210 side increases in a cross-section that is along the extending direction of optical transmission member 300 and is perpendicular to rear surface 270 of ferrule 500 when optical transmission member 300 is held at optical transmission member holding part 210 as illustrated in FIG. 9C. With through hole 550 including step 551, a constricted portion can be formed in through hole 550. In this manner when an adhesive agent is used to fix optical transmission member 300 to ferrule 500, the adhesive agent can be retained in through hole 550, and can be prevented from reaching rear surface 270 of ferrule 500. In this manner, the ease of assembling of the optical connector increases.

The size of the opening (constricted portion) formed with the step 551 is preferably 0.05 mm to 0.1 mm in the above-described cross-section from a view point of suppressing the leakage of the adhesive agent.

In addition, in the present embodiment, through hole 550 includes a tapered part in the above-described cross-section as illustrated in FIG. 9C. The tapered part includes tilted surface 552 on optical transmission member holding part 210 side that is tilted toward first surface 220 in the direction toward rear surface 270 of ferrule 500, and tilted surface 553 on first surface 220 side that is tilted away from first surface 220 in the direction toward rear surface 270 of ferrule 500.

The above-described step 551 is disposed at the end portions of tilted surface 552 and tilted surface 553 on rear surface 270 side of ferrule 500.

Effects

Ferrule 500 according to the present embodiment includes step 551 in through hole 650. In this manner, the adhesive agent is retained in through hole 650 and prevented from reaching rear surface 270 of ferrule 500.

Embodiment 4

Figure 10A:
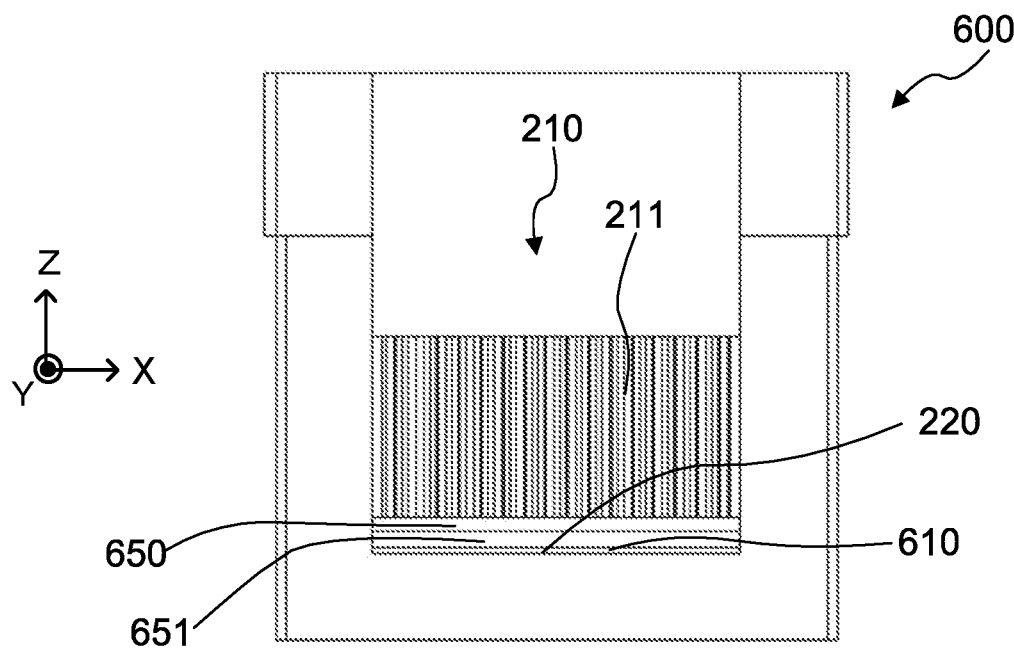
FIG. 10A is a plan view of a ferrule according to Embodiment 4.
Figure 10B:
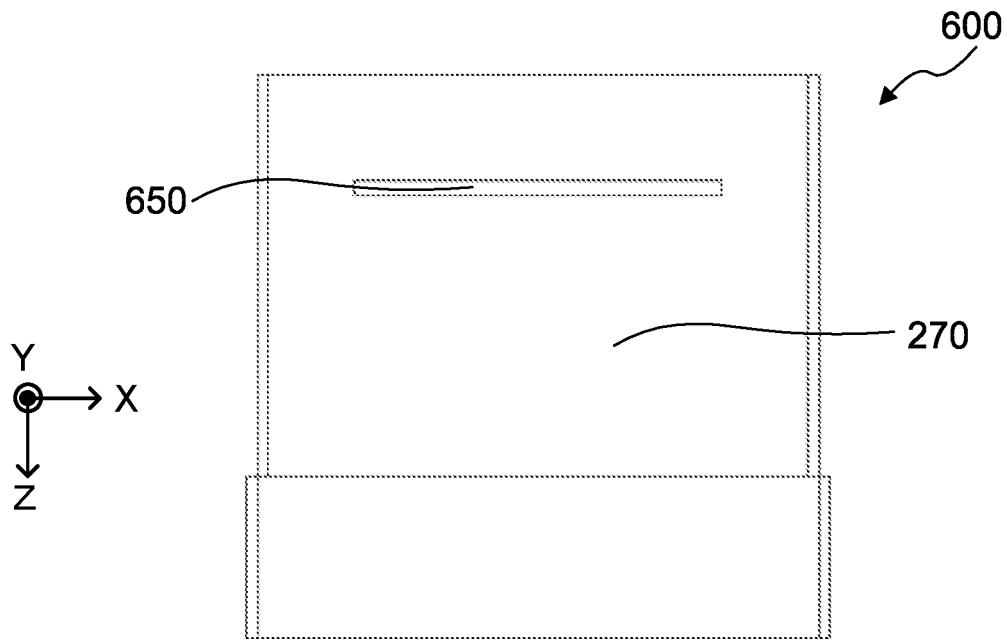
FIG. 10B is a bottom view.
Figure 11A:
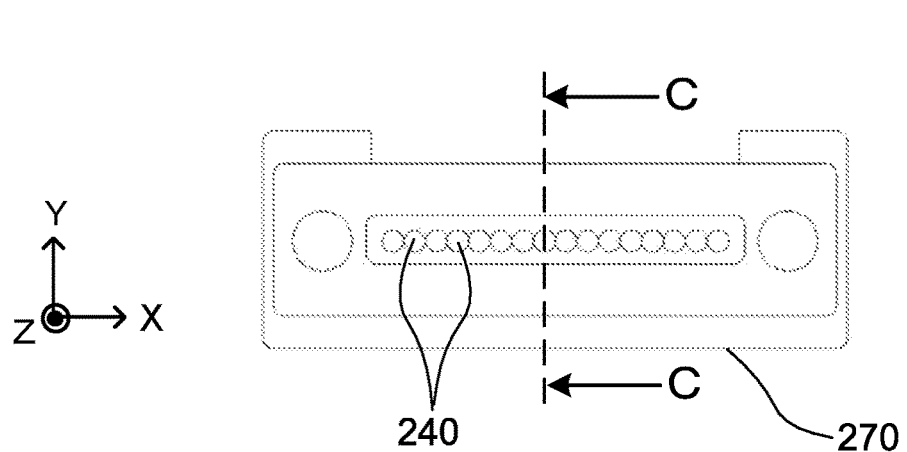
FIG. 11A is a front view of a ferrule according to Embodiment 4.
Figure 11B:
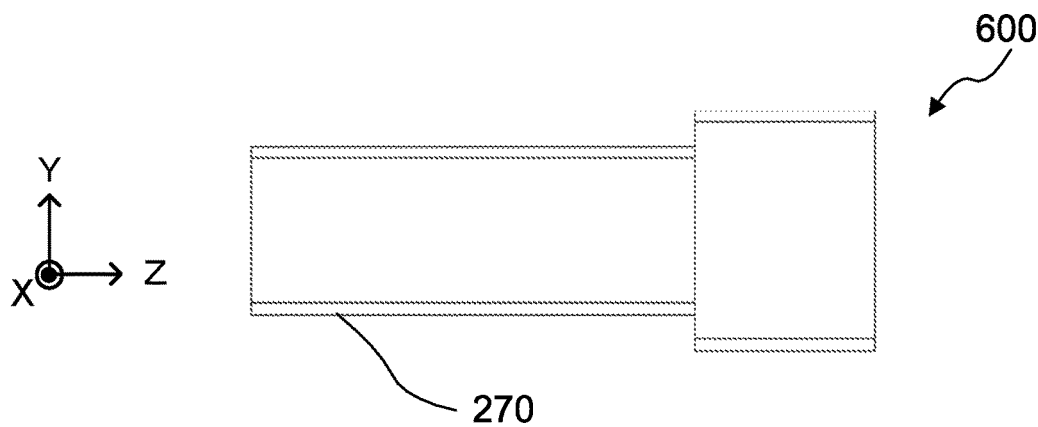
FIG. 11B is a right side view.
Figure 11C:
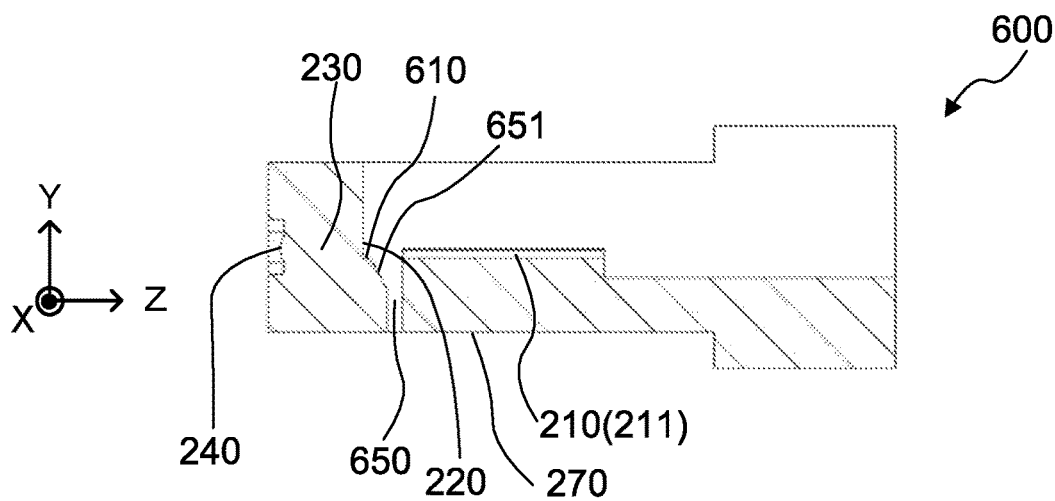
FIG. 11C is a sectional view.

FIGS. 10A to 11C illustrate ferrule 600 according to Embodiment 4. FIG. 10A is a plan view of ferrule 600 according to Embodiment 4, FIG. 10B is a bottom view of ferrule 600, FIG. 11A is a front view, FIG. 11B is a right side view, and FIG. 11C is a sectional view taken along line C-C of FIG. 11A. In ferrule 600 according to Embodiment 4, the same components as those of ferrule 200 according to Embodiment 1 are denoted with the same reference numerals and the description thereof is omitted.

As illustrated in FIG. 11C, ferrule 600 is different from ferrule 200 illustrated in FIG. 4C in that optical transmission member supporting part 610 disposed between first surface 220 and the opening of through hole 650 on first surface 220 side and configured to support optical transmission member 300 is provided. In addition, as illustrated in FIG. 11C, the shape of through hole 650 provided in ferrule 600 is different from that of through hole 250 of ferrule 200 according to Embodiment 1. Optical transmission member supporting part 610 and through hole 650 are described below.

As described above, optical transmission member supporting part 610 is disposed between first surface 220 and the opening of through hole 650 on the first surface side. In this manner, optical transmission member supporting part 610 can support the end portion of optical transmission member 300 at a position close to first surface 220, and thus the end portion of optical transmission member 300 can be easily correctly aligned with respect to first surface 220. In addition, when optical transmission member 300 is fixed to ferrule with an adhesive agent, it is pulled downward by the adhesive agent reaching through hole 650. When pulled downward as described above, optical transmission member supporting part 610 contributes to supporting optical transmission member 300 and aligning the end portion with respect to first surface 220.

Preferably, optical transmission member supporting part 610 is configured to support the end portion of optical transmission member 300 at a correct position with respect to first surface 220 when optical transmission member 300 is disposed at optical transmission member holding part 210.

In the present embodiment, the height (the height in the Y direction) of optical transmission member supporting part 610 is substantially the same height as the height of the bottom portion (the height of the bottom portion of insertion port 212 or groove 211) of optical transmission member holding part 210 in a cross-section that is along the extending direction of optical transmission member 300 and is perpendicular to rear surface 270 of ferrule 600 when optical transmission member 300 is held at optical transmission member holding part 210 as illustrated in FIG. 11C.

In addition, in the present embodiment, optical transmission member supporting part 610 is disposed along first surface 220 in plan view as illustrated in FIG. 10A.

In addition, the length (the length in the Z direction) of optical transmission member supporting part 610 in the extending direction of optical transmission member 300 may be appropriately set as long as the end portion of optical transmission member 300 can be supported and foreign matters are not accumulated. More specifically, preferably, the length is greater than 0 mm and equal to or smaller than 0.1 mm When the length is within this range, optical transmission member 300 can be supported while suppressing the retention of foreign matters. Note that the length is 0.1 mm in the present embodiment.

As illustrated in FIG. 11C, through hole 650 includes tilted surface 651 that is tilted away from first surface 220 in the direction toward rear surface 270 of ferrule 600. Note that preferably, the tilted surface 651 is disposed on optical transmission member supporting part 610 side of through hole 650. With through hole 650 including this tilted surface 651, foreign matters retained at optical transmission member supporting part 610 easily enter through hole 650.

Effects

Ferrule 600 according to the present embodiment includes optical transmission member supporting part 610. Thus, the end portion of optical transmission member 300 can be more correctly aligned with respect to first surface 220. In addition, through hole 650 includes tilted surface 651. In this manner, foreign matters retained at optical transmission member supporting part 610 easily enter through hole 650.

Other Embodiments

The above-mentioned embodiments are merely examples of embodiments for implementing the invention, and the technical scope of the invention should not be interpreted as limited by the above-mentioned embodiments. The features and configurations shown in the above embodiments can be arbitrarily combined, and the combined embodiments also belong to the technical scope of the invention.

Optical Connector Module

Optical connector 100 according to the embodiment of the present invention includes optical transmission member 300 and the ferrule. Optical connector 100 according to the embodiment of the present invention can be used as an optical connector module together with a housing, a spring clamp structure and the like.

Industrial Applicability

The ferrule according to the embodiment of the present invention is suitable for removing foreign matters in a ferrule.

Reference Signs List

100 Optical connector
200, 400, 500, 600 Ferrule
210 Optical transmission member holding part
211 Groove
212 Insertion hole
220 First surface
230 Light transmission wall
240 Second surface
250, 550, 650 Through hole
250a, 550a Opening
251, 552, 553, 651 Tilted surface
260 Lid
261 Optical transmission member pressing part
270 Rear surface
300 Optical transmission member
551 Step
610 Optical transmission member supporting part

The invention claimed is:

1. A ferrule, comprising:
   an optical transmission member holding part configured to hold an optical transmission member;
   a first surface that faces an end portion of the optical transmission member and where a light from the optical transmission member impinges when the optical transmission member is held at the optical transmission member holding part;
   a second surface configured to emit, to outside of the ferrule, light entered from the first surface and travelled inside of the ferrule, wherein the second surface is an optical control surface; and
   a through hole that is open between the optical transmission member holding part and the first surface.

2. The ferrule according to claim 1, wherein the optical transmission member holding part includes a groove configured to dispose the optical transmission member, or an insertion hole configured to insert the optical transmission member.

3. The ferrule according to claim 1, wherein the through hole includes a tapered part that becomes thinner as a distance from an opening on an optical transmission member holding part side increases.

4. The ferrule according to claim 1, wherein the through hole opens between the optical transmission member holding part and the first surface, and opens at a rear surface of the ferrule.

5. The ferrule according to claim 4, wherein in a cross-section that is along an extending direction of the optical transmission member and is perpendicular to the rear surface of the ferrule when the optical transmission member is held at the optical transmission member holding part, a size of an opening of the through hole on a first surface side is 0.2 mm to 0.3 mm, and a size of an opening of the ferrule on a rear surface side is 0.05 mm to 0.1 mm.

6. The ferrule according to claim 4, wherein in a cross-section that is along an extending direction of the optical transmission member and is perpendicular to the rear surface of the ferrule when the optical transmission member is held at the optical transmission member holding part, the through hole includes a step whose width discontinuously increases as the distance from the opening on the optical transmission member holding part side increases.

7. The ferrule according to claim 1, further comprising an optical transmission member supporting part disposed between the first surface and an opening of the through hole on a first surface side, and configured to support the optical transmission member.

8. An optical connector, comprising:
   the ferrule according to claim 1; and
   an optical transmission member held by the optical transmission member holding part of the ferrule.

9. An optical connector module, comprising the optical connector according to claim 8.

* * * * *